US010032371B2

(12) United States Patent
Gonzales et al.

(10) Patent No.: US 10,032,371 B2
(45) Date of Patent: Jul. 24, 2018

(54) NOTIFICATION OF BICYCLE DETECTION FOR CYCLISTS AT A TRAFFIC INTERSECTION (71) Applicant: ITERIS, Inc., Santa Ana, CA (US)

(72) Inventors: Vance A. Gonzales, Modesto, CA (US); Matthew W. Linton, Tustin, CA (US); Robert Y. Ung, San Bernardino, CA (US); Todd W. Kreter, Irvine, CA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 15/494,274

(22) Filed: Apr. 21, 2017

(65) Prior Publication Data
US 2017/0309174 A1 Oct. 26, 2017

Related U.S. Application Data (60) Provisional application No. 62/326,472, filed on Apr. 22, 2016.

(51) Int. Cl.
G08G 1/09 (2006.01)
B60Q 1/00 (2006.01)
G08B 7/06 (2006.01)
G06K 9/00 (2006.01)
G08B 21/02 (2006.01)
G08G 1/01 (2006.01)
G08G 1/015 (2006.01)
(Continued)

(52) U.S. Cl.
CPC ............ G08G 1/09 (2013.01); B60Q 1/00 (2013.01); G06K 9/00771 (2013.01); G08B 7/06 (2013.01); G08B 21/02 (2013.01); G08G 1/015 (2013.01); G08G 1/0116 (2013.01); G08G 1/04 (2013.01); G08G 1/042 (2013.01)

(58) Field of Classification Search
CPC .......... G08G 1/0175; G08G 1/01; G08G 1/09; G08G 1/0133; G08G 1/166; G08G 1/04; G08G 1/0104; G08G 1/07; G08G 1/095; G06K 9/00791; B60W 2550/22
See application file for complete search history.

(56) References Cited

U.S. PATENT DOCUMENTS 6,731,202 B1  5/2004  Klaus
6,861,959 B1  3/2005  Torres Sabate et al.
7,443,291 B2  10/2008  Terui
(Continued)

OTHER PUBLICATIONS

Shladover et al., Bicycle Detection and Operational Concept at Signalized Intersections, California PATH Research Report, UCB-ITS-PRR-2009-37, Aug. 2009.

Primary Examiner — Mohamed Barakat
(74) Attorney, Agent, or Firm — Lazaris IP (57) ABSTRACT Bicycle identification and cyclist notification at a traffic intersection includes determining a presence of a bicycle in a traffic detection zone and communicating an indicator that notifies the cyclist of both successful detection and that the presence has been communicated to the traffic system controller, so that a green light will be provided at the appropriate time for safe passage. Detectors at or near a roadway approach sense the presence or absence of a bicycle, and when a bicycle is detected, a signal communicated to the traffic signal controller for conversion to a suitable output signal that actuates notifications for cyclists.

27 Claims, 6 Drawing Sheets (51) Int. Cl.
*G08G 1/04* (2006.01)
*G08G 1/042* (2006.01)

(56) References Cited

U.S. PATENT DOCUMENTS

| | | | |
|---|---|---|---|
| 7,719,417 B2 | 5/2010 | Terui | |
| 8,933,818 B2 | 1/2015 | Gao et al. | |
| 9,646,494 B2 * | 5/2017 | Gao | G08G 1/015 |
| 2005/0196015 A1 * | 9/2005 | Luo | G06K 9/00234 382/103 |
| 2005/0233285 A1 * | 10/2005 | Miyamaru | G09B 9/058 434/61 |
| 2011/0316719 A1 | 12/2011 | Obuchi et al. | |
| 2014/0118128 A1 * | 5/2014 | Orzeck | B62J 3/00 340/432 |
| 2014/0177911 A1 | 6/2014 | Heisele | |
| 2015/0077236 A1 * | 3/2015 | Le Masurier | G08G 1/163 340/435 |

* cited by examiner

NOTIFICATION OF BICYCLE DETECTION FOR CYCLISTS AT A TRAFFIC INTERSECTION

CROSS-REFERENCE TO RELATED PATENT APPLICATIONS

This patent application claims priority to U.S. provisional application 62/326,472, filed on Apr. 22, 2016, the contents of which are incorporated in their entirety herein. In accordance with 37 C.F.R. § 1.76, a claim of priority is included in an Application Data Sheet filed concurrently herewith.

FIELD OF THE INVENTION

The present invention relates to the field of traffic detection. Specifically, the present invention relates to providing a notification advising a cyclist of detection at a traffic intersection following identification of an object as a bicycle for public safety and traffic signal timing and control.

BACKGROUND OF THE INVENTION

Bicycles and cyclists have always been a part of traffic flow in North America and elsewhere around the world, even pre-dating the presence of motorized vehicles. Today, cyclists exist in traffic alongside motorists and have unique challenges for mobility within a city or highway transit environment.

For years, bicycle users have been challenged with how to indicate to a traffic signal that they are present so that they can obtain a green light. There are only a few ways for a cyclist to provide an indication to a traffic signal controller at a signalized intersection that it is present: the cyclist can press a pedestrian crosswalk or bicycle pushbutton, wait for a car to pull up in the same direction so that the car is detected and triggers the green light or, simply assume that detection has occurred.

When pushing a pedestrian pushbutton, often the cyclist has to dismount the bicycle in the roadway and step onto the sidewalk to access the crossing pushbutton. With a special bicycle crossing pushbutton, the cyclist can often stay on the bicycle and lean over to push the button. Depending on intersection geometry and configuration, the cyclist may have to unsafely cross a vehicle lane to access the pushbutton.

Cyclists often assume they have been detected and hope that a traffic light will turn green soon for them to pass through. If they do not get a green light and are 'missed' they will often determine that the only way to cross is to wait for an acceptable moment to cross against the red light. This can result in dangerous situations, such as near-misses and collisions, endangering safety of all users of the traffic intersection.

Traffic engineers and planners discourage the use of the pedestrian crossing for bicycle users, as the timing required for pedestrians to safely cross is far greater than that of a cyclist. This causes inefficiency in signal timing and can lead to higher congestion in busy periods, as well as frustration during quiet times as motorists wait for a green light when no traffic is present in the opposing signal phases and the cyclist has already passed through the crosswalk.

More recent advances in detection technology allow bicycles to be detected at intersections automatically, as has been done for years for motor vehicles. Examples of these types of detection include wired loops in the roadway, radar sensors, infrared sensors and video sensors. There are many new types of in-ground loop detectors that attempt to pick up the metal signature of a bicycle crossing over the loop. Different shapes (diamond, parallelogram) and sizes and sensitivities have been used with varying levels of success. However, with many new bicycles being made from non-metallic carbon fiber, this technology has faced increased challenges to accurately detect bicycles. Non-invasive technologies such as radar and video detection attempt to identify bicycles by their radar reflective signature or through the analysis of pixels in a digital video image. Both of these technologies can successfully detect bicycles of many different sizes, shapes and materials. In mixed-flow traffic, however, they can have difficulty in differentiating between motorcycles and bicycles. Thus the present array of techniques do not offer a single comprehensive solution to detection with a high degree of accuracy.

Therefore, despite advances in automatic detection, it remains that cyclists have no way of confidently knowing if their presence has been detected, and may continue to engage in dangerous intersection crossing behavior as a result.

BRIEF SUMMARY OF THE INVENTION

The present invention addresses issues with cyclists not knowing whether they have been detected to improve bicycle safety and efficiency. In one aspect, the present invention interprets sensor data that is generated by detector(s) and converts that information to a useable notification element to inform and alert a roadway user that the traffic signal apparatus is aware of their presence, and will serve them in turn. In the present invention, sensor data is used to identify an object as a bicycle in a traffic detection zone of a traffic intersection. If a bicycle is detected, a signal is sent to a traffic signal controller, and the signal is read and then converted into an indicator for the cyclist. If sensor data then indicates that a bicycle is no longer present, a further signal may be sent to deactivate the indicator.

The present invention provides systems and methods of identifying an object in an area of interest in a field of view of a traffic detection zone, and generating a notification to alert cyclists that their bicycle has been detected. These systems and methods present a bicycle detection and notification framework that is initialized by receiving sensor data for the area of interest and determining if an object detected in the area of interest is a bicycle. The bicycle detection and notification framework is configured to generate multiple outputs based on such a detection in different formats, depending on one or more factors such as the type of detection and the configuration of the traffic intersection.

There are many possible ways of notifying a cyclist that their bicycle has been detected. One way is with a physical alert, such as a signposted indication on a pole adjacent to lanes of a roadway at the traffic intersection. Such a physical alert may be triggered by an electronic signal communicated by a traffic signal controller. Additionally, a video signal may also be used to provide a screen-based alert. A wireless signal may also be used to provide the alert notifying the cyclist of detection, for example via an application resident on a mobile computing device, such as a telephone, a watch or other personal fitness device, and headwear.

Depending on the method of detection, logic may be arranged and implemented to convert data indicating a presence or absence of a bicycle to one or more of these notification methods to alert the cyclist. If multiple detection methods are used, for example in the case of both a passive detector and a wireless sensing detector, a choice may be made to output all forms of notification, or to specifically output only the notification method that corresponds to the detection method. For example, where a video detection unit and an application-based wireless detection protocol are both present at an intersection, if the present invention detects a single rider via the wireless application, it may choose to send a signal back via this method. Where detection is accomplished via a video detection approach, it may send a signal back via a light or other physical indicator.

It is therefore one objective of the present invention to provide a system and method of providing a notification to cyclists to advise them that they have been detected at a traffic intersection. It is another objective of the present invention to provide a system and method of identifying an object at a traffic intersection as a bicycle, and generating a notification to the cyclist following identification. It is still another objective to provide a system and method of determining a method of detection of a bicycle at a traffic intersection, and selecting an appropriate notification for the cyclist based on the method of detection. It is yet another objective of the present invention to improve traffic signal timing, improve cyclist satisfaction, and improve safety at traffic intersections by providing confidence in detection of cyclist presence.

In one embodiment of the present invention, a method, comprises receiving sensor data collected from at least one sensor positioned in or near a traffic intersection, the sensor data indicating that an object is detected in one or more lanes of a roadway proximate to the traffic intersection, and analyzing the sensor data within a computing environment in one or more data processing modules executed in conjunction with at least one specifically-configured processor, the one or more data processing modules configured to identify the object from the sensor data, by analyzing characteristics among the sensor data in a field of view of a traffic detection area representing the one or more lanes of the roadway, to classify the object as a bicycle, and converting the sensor data into an indicator representative of a presence of the bicycle. The method also includes transmitting the indicator to a control system, and generating a notification from the indicator to alert the cyclist that the presence of the bicycle has been detected at the traffic intersection.

In another embodiment of the present invention, a method of notifying a cyclist of detection at a traffic intersection comprises classifying an object in a traffic detection area at a traffic intersection from sensor data collected from at least one sensor positioned in or near the traffic intersection, the sensor data indicating that the object is detected in a field of view representing one or more lanes of a roadway proximate to the traffic intersection, by analyzing characteristics in multi-dimensional data point attributes in the sensor data to determine if the object is a bicycle, in one or more of an optical flow analysis to evaluate motion in the traffic detection zone, an edge detection analysis to evaluate spatial and temporal attributes of pixels in the sensor data, and a template matching analysis to compare the object with known attributes of a motorized vehicle, a bicycle, and a pedestrian, converting the sensor data into an indicator representative of a presence of the bicycle, and applying the indicator to a control system to generate a notification to alert the cyclist that the presence of the bicycle has been detected at the traffic intersection.

In still another embodiment, a system comprises, in a computing environment including at least one non-transitory computer-readable storage medium having program instructions stored therein and a computer processor operable to execute the program instructions within one or more data processing modules configured to notify a cyclist of detection at a traffic intersection, the one or more data processing modules including a classification module configured to analyze characteristics in sensor data collected from at least one sensor positioned in or near a traffic intersection, the sensor data indicating that an object is detected in one or more lanes of a roadway proximate to the traffic intersection, to classify the object as a bicycle, and an output module configured to convert the sensor data into an indicator representative of a presence of the bicycle and communicate the indicator to a control system, and generate a notification from the indicator to alert the cyclist that the presence of the bicycle has been detected at the traffic intersection.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
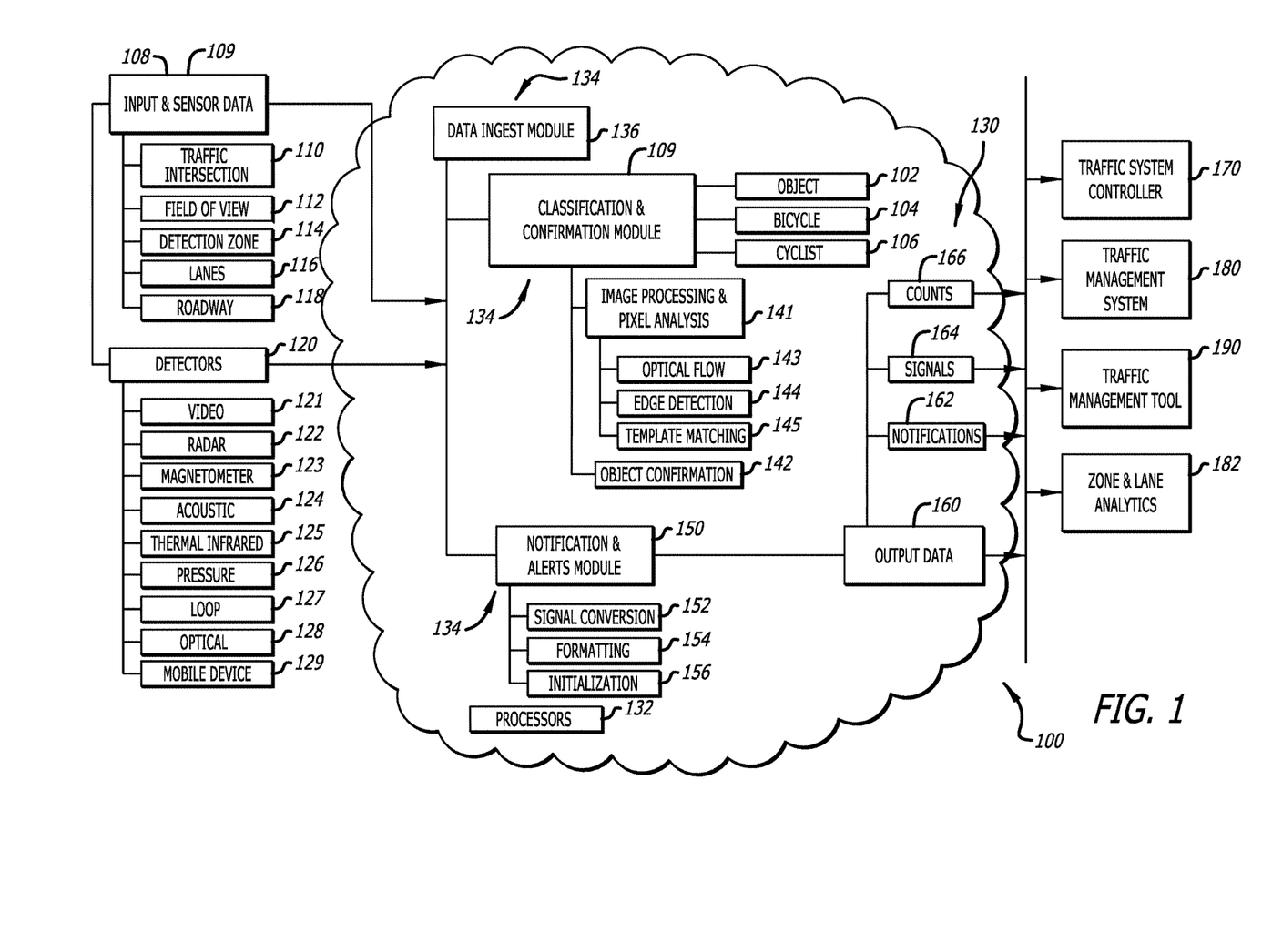
FIG. 1 is a system diagram for a bicycle detection and notification framework according to one aspect of the present invention.

FIG. 1 is a system diagram illustrating elements of a bicycle detection and notification framework 100, according to one aspect of the present invention. The bicycle detection and notification framework 100 is performed within one or more systems and/or methods that includes several components, each of which define distinct activities for sensing an object 102 in a field of view 112 of a traffic detection zone 114, classifying and identifying the object 102 as a bicycle 104, confirming the identification, and generating a notification 162 that alerts cyclists 106 that the bicycle 104 has been detected for traffic intersection control and improved roadway safety.

The bicycle detection and notification framework 100 ingests, receives, requests, or otherwise obtains input data 108 (and additional input data 109, discussed further below; this may be collectively referred to herein as input data 108) that represents objects 102 detected in a field of view 112 of the traffic detection zone 114. Input data 108 is collected from the one or more sensors 120, which may be positioned in or near one or more lanes 116 of a roadway 118 area at a traffic intersection 110. The one or more sensors 120 may include many different types of detection systems and methods, such as video cameras 121, radar systems 122, magnetometers 123, acoustic sensors 124, thermal or infrared cameras/sensors 125, pressure pads 126, wire loops 127, optical beams 128 and any other devices or systems which are capable of detecting a presence of objects 102 within a traffic intersection environment.

The one or more sensors 120 may also include components that receive signals from mobile computing devices 129 used by cyclists 106 during bicycle operation. These signals may be generated by specific applications resident on such mobile computing devices 129, either automatically or at the manual direction of the cyclist 106. These signals may also include information defining positional coordinates of the cyclist 106 that may be represented in one or more GPS data points. The bicycle detection and notification framework 100 may therefore include a Global Positioning System (GPS), having components such as a GPS-enabled receiver, which detects such signals relative to the position of the cyclist 106 and receives the one or more GPS data points to compute the position relative to the traffic intersection 110. Such information is interpreted in the present invention to determine if a bicycle 104 is present in a traffic detection zone 114.

The one or more sensors 120 also produce additional input data 109 as noted above, for example where the bicycle detection and notification framework 100 includes a confirmation aspect that checks for further information about an object 102 in a traffic detection zone 114. It is therefore contemplated that the bicycle detection and notification framework 100 of the present invention may ingest input/sensor data 108 and 109 from more than one sensor 120 to accurately classify, identify, and confirm a presence of an object 102 at a traffic intersection 110 as that of a bicycle 104.

The input data 108 and additional input data 109 from the one or more sensors 120 are applied to a plurality of data processing modules 134 within a computing environment 130 that also includes one or more processors 132, a plurality of software and hardware components, and one or more modular software and hardware packages configured to perform specific processing functions. The one or more processors 132, plurality of software and hardware components, and one or more modular software and hardware packages are configured to execute program instructions to perform algorithms for various functions within the bicycle detection and notification framework 100 that are described in detail herein, and embodied in the data processing modules 134.

The plurality of data processing modules 134 include a data ingest component 136 configured to ingest, receive, request, or otherwise obtain input data 108 and additional input data 109. The plurality of data processing modules 134 also include a classification and identification module 140 that is configured to initialize the bicycle detection and notification framework 100 and retrieval of input data 108 and 109 for performing the classification, identification and confirmation functions of the present invention. These are performed at least within an image processing and pixel analysis component 141 and an object confirmation component 142. The image processing and pixel analysis component 141 may perform various functions on input data 108 and additional input data 109, such as for example an optical flow analysis 143, an edge detection analysis 144, and a template matching analysis 145.

In one embodiment of the present invention, the object confirmation component 142 performs additional processing of input data 109 to check whether the object 102 is indeed a bicycle 104. The object confirmation component 142 queries for additional sensor data 109 collected from one or more additional detectors 120 to confirm the classification of the object 102. The bicycle detection and notification framework 100 may be configured in such an embodiment to receive a communication from an application resident on a mobile computing device 129 used by a cyclist 106 and generating a signal at or near the traffic intersection 110. The bicycle detection and notification framework 100 may also be configured to receive input data 109 from one or more of pressure, heat, position, or inductance sensors relative to one or both of the bicycle 104 and the cyclist 106 at or near the traffic intersection 110. Regardless, it is to be understood that the present invention may utilize the object confirmation component 142 to ensure a correct classification of a bicycle 104, and may query additional detectors 120 at a traffic intersection 110 for additional input data 109 to perform such a confirmation. Regardless, the present invention may continually evaluate the sensor data 108 (and the additional input data 109, where applicable) to determine if the bicycle 104 is still present in the field of view 112 or the traffic detection area 114, and communicate a signal 164 to cancel the notification 162 where the bicycle 104 is no longer detected at the traffic intersection 110.

The plurality of data processing modules 134 further include a notifications and alerts module 150 which performs functions such as signal conversion 152, alert formatting 154, and alert initialization 156. The notifications and alerts module 150 generates output data 160 in the form of a notification 162 and initializes communication of the notification 162 as indicator or other alert to cyclists 106.

The output data 160 may be configured in many ways in the present invention, depending at least in part upon the configuration of a traffic system controller 170. For example, output data 160 may be configured to directly notify or alert a cyclist 106 as an output of the notifications and alerts module 150. Additionally, output data 160 may be configured to transmit a signal 164 to actuate a control system, for example in conjunction with a traffic system controller 170 or traffic management system 180. Other outputs are possible, such as a count 166 of objects 102 at a traffic intersection 110, and data that provides information for analytics within a traffic management system 180, such as zone and lane analytics 182. Regardless, the notifications and alerts module 150 creates an output representing the detection of an object 102 as a bicycle 104, by receiving a confirmation generated by the classification and identification module 142, and converting this information into an output.

Incoming signals from detectors and carrying input data 108 and additional input data 109 may be any number of signals in any form, representing for example different approaches of a traffic intersection 110, or separate lanes or areas, including bicycle lanes, crosswalk waiting areas, and pedestrian crossing areas. Such incoming signals be transmitted via wired or wireless means, and may be either on/off binary signals or digital packets describing a signal. Output sent to the one or more indicators may similarly be transmitted via wired or wireless means, and may be either on/off binary signals or digital packets describing a signal.

The notifications and alerts module 150 also initializes notifications 162 from the confirmation generated as output by the classification and identification module 142. The notifications and alerts module 150 may also include the ability to format the notification 162 for the appropriate delivery channel for the cyclist 106, and therefore may be further configured to determine an appropriate alert for the cyclist 106.

Notifications 162 may be provided in many forms. For example, a notification 162 may be a physical alert such as a light on an assembly positioned in a location at the traffic intersection 110 where it can be seen by the cyclist 106. Notifications 162 provided by lights may involve illumination of a light, illumination of a sign, a backlit illumination of a sign, and a display of words on a sign. Regardless, assemblies involving such illumination may be mounted on poles adjacent to bicycle or traffic lanes, such as a street light pole or a signal pole, or may be mounted on a separate pole, on a mast arm of a pole, or on a camera or radar housing. The assembly may also be separately mounted in the ground, on a curb, or on a sidewalk at the traffic intersection 110.

Figure 2:
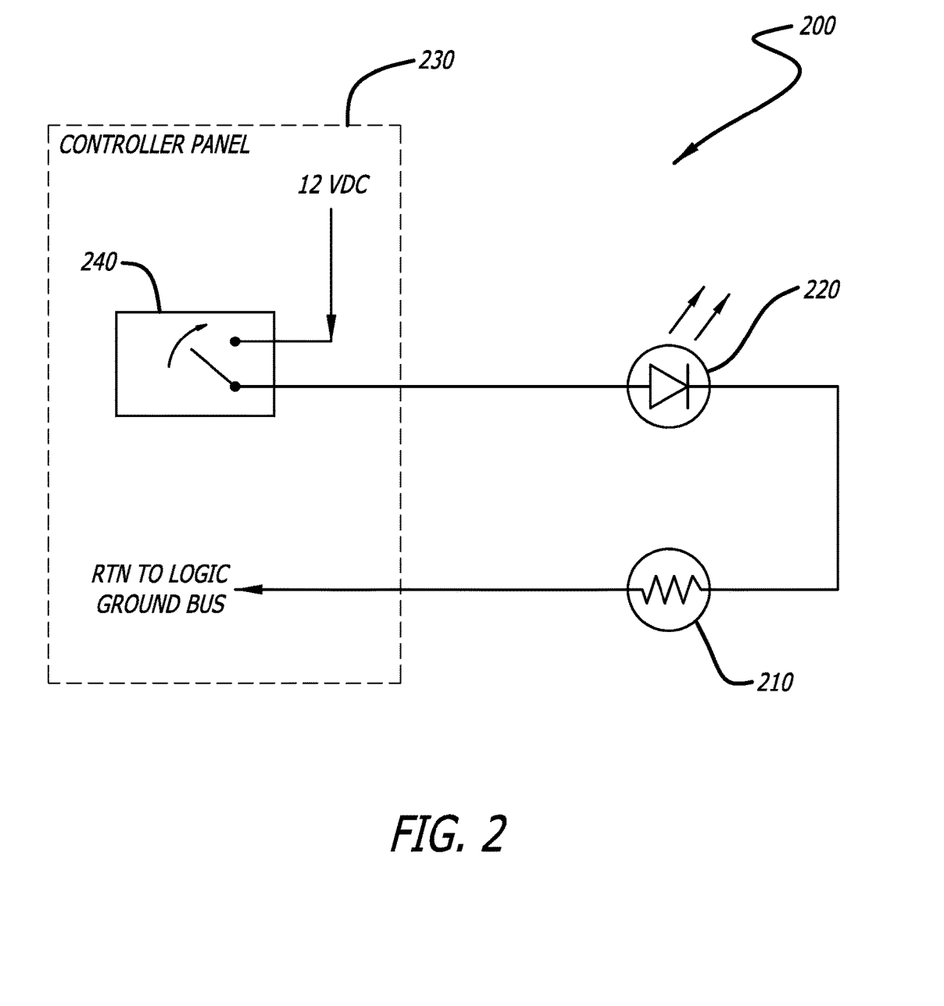
FIG. 2 is circuit diagram incorporating an ambient light sensor according to one embodiment of the present invention.

Such assemblies may illuminate a single light, for example a LED (light emitting diode), or a series of LEDs that together comprise an appropriate indicator (for example, in shape of a bicycle). Such assemblies may also include ambient light sensors and weather sensors that continuously adjust the brightness of LEDs for the cyclist 106, for example to lower brightness as night approaches, or increase brightness during daytime hours or during inclement weather conditions. The bicycle detection and notification framework 100 may therefore incorporate a brightness control circuit 200 with continuously variable brightness capability where such as assembly is used to provide cyclist notifications. FIG. 2 shows an example of such a brightness control circuit 200, where an ambient light sensor 210 is coupled to a high-intensity LED 220. Both the sensor 210 and the high-intensity LED 220 are connected to a traffic signal controller panel 230, which also includes a power supply 240.

A notification 162 may also be a video signal that provides an indication to the cyclist 106 that he or she has been detected using a video screen mounted at or near the traffic intersection 110. Video screens may be mounted on poles adjacent to bicycle or traffic lanes 116, and the video signal may provide the appropriate indication to the cyclist 106 in any number of ways. For example, the video signal may display the cyclist 106 himself or herself on screen, or may simply show a bicycle in a particular color, such as green. It is to be understood that many implementations of a displaying a video signal are possible and are within the scope of the present invention, and that such a video signal may contain information suitable to illuminate a video screen in many ways.

A notification 162 may also be a wireless signal that is capable of being received and interpreted by, for example, an application based on a mobile computing device 129 used by the cyclist 106. The mobile computing device 129 may be in the form of a computer-enable telephone, "smart" wristwatch, fitness watch or bracelet, headgear or eyewear such as those configured for augmented or virtual reality applications, or any other special-purpose personal electronic device. Additionally, the wireless signal may be capable of generating a video indication, a physical indication, or an audible indication using the application based on the mobile computing device 129. For example, where a cyclist 106 is using augmented reality headwear while riding a bicycle, a green bicycle may be illuminated on the headgear to alert the cyclist 106 of detection at the traffic intersection 110.

A notification 162 may also be provided as a signal that produces an audible sound, for example as a voice recording provided over a speaker system positioned at or near the traffic intersection 110. Additionally, multiple notifications 162 may also be provided, for example in one or more signals that produce both a physical alert and an audible sound. It is to be understood therefore that the present invention is not to be limited by any one type of notification 162 specifically addressed herein.

As noted above, and as discussed below with regard to FIG. 4, the bicycle detection and notification framework 100 may be configured to determine an appropriate notification 162 for the cyclist 106. The appropriate notification 162 may be selected by matching a signal format of the notification 162 to a signal format of one or both of the at least one detector 120 and the one or more additional detectors 120. Therefore, where input data 108 is provided by a signal incoming from an application resident on a mobile computing device 129 used by a cyclist 106, the output of the bicycle detection and notification framework 100 may be matched to the input so that a notification 162 of bicycle detection is provided back to the mobile computing device 129. Accordingly, one or more outputs of the bicycle detection and notification framework 100 may be activated depending on the method of detection of the object 102 in the traffic detection zone 114.

The image processing and pixel analysis component 141 is configured to analyze pixel characteristics among the sensor data 108 and 109 in a field of view 112 of a traffic detection zone 114 representing the one or more lanes 116 of the roadway 118, to initially classify the object 102 as a bicycle 104. This may be performed by analyzing multi-dimensional data point attributes to classify the object 102, using one or more of the techniques noted herein.

In one embodiment, the image processing and pixel analysis component 141 classifies an object 102 by creating a virtual bicycle zone in one or more lanes 116 of the roadway 118 to specifically identify bicycles 104 therein. The virtual bicycle zone is created and positioned in vehicular lanes and/or bicycle-specific lanes 116 as desired, and a bicycle detection strip is automatically generated on top of and at a specified point adjacent to each virtual bicycle zone. The bicycle detection strip is an extension of the virtual bicycle zone and is generated based on a number of considerations. It is an area adjacent to the virtual bicycle zone that is automatically generated and represents an initial "triggering" area of the virtual bicycle zone that is invisible to the traffic engineers and other users. The bicycle detection strip has the same orientation as the bicycle zone, but has its own height and width. The size of the bicycle detection strip may vary depending on the location of the virtual bicycle zone, its size, and the number and location of surrounding zones.

When motion inside the bicycle detection strip is detected, the present invention proceeds with determining what type of object 102 is present within the virtual bicycle zone as the object 102 moves through the detection strip. The bicycle detection strip therefore operates as a triggering area as noted above, so that when motion is observed using at least one of means of detection (for example, one or more video camera) available, additional data processing functions are initiated and applied to the rest of the virtual bicycle zone to make an accurate determination of the type of object 102 present.

In such an embodiment, the image processing and pixel analysis component 141 may use object pattern recognition in an attempt to determine if the object 102 present in the bicycle detection strip is a narrow object or a wide object. If it is a narrow object, and detection is indicated in the virtual bicycle zone, then a bicycle 104 will be identified. If it is a wide object and detection is indicated in the virtual bicycle zone, a regular motorized vehicle will be identified, and the detection will be rejected as "not a bicycle." The bicycle detection and notification framework 100 of the present invention therefore attempts to classify all moving objects 102 into two classes: narrow moving objects (assumed to be bicycles 104) and wide moving objects (assumed to not be bicycles 104). In the bicycle detection strip, the present invention analyzes pixels that experience changes from frame to frame in a video data stream taken by one or more video cameras 121. Pixels within this stream are analyzed as the object passes through the bicycle detection strip on a frame-by-frame basis. From this pixel-based analysis, the present invention derives an initial decision of whether the object 102 moving through the bicycle detection strip is wide or narrow.

Therefore, in such an embodiment object pattern classification is used in the area defined by the bicycle detection strip. The bicycle detection and notification framework 100 may not rely solely on this decision, however. While the bicycle detection strip provides a good initial decision of whether the object 102 which is coming to the virtual bicycle zone is wide or narrow, the present invention performs further data processing to confirm or reject the decision from the pixel-based analysis. The bicycle detection and notification framework 100 further analyzes characteristics of objects 102 inside the virtual bicycle zone to confirm or reject the initial decision as more information becomes available as the object 102 passes through the virtual bicycle zone. For example, one characteristic is expected gray scale changes in images from the virtual bicycle zone. Once an object 102 arrives in the bicycle zone as indicated by its motion in the bicycle detection strip, the present invention looks for gray scale changes in images taken over time as the object 102 passes through the bicycle zone. Another characteristic is predicted motion. The bicycle detection and notification framework 100 attempts to compare behavior of an object 102 with expected behavior of both a bicycle 104 and a motorized vehicle. Furthermore, a series of detection rules may also be applied to confirm or reject the initial decision from the bicycle detection strip. Examples of detection rules involve a speed of the object, visibility of a person riding on the bicycle 104 or in a motorized vehicle, visibility of vehicle registration tags, whether and how quickly an object begins to charge an inductive loop embedded in the roadway 118, and other characteristics differentiating bicycles 104 from motorized vehicles. One or more outcomes of these characteristic analyses are then applied to confirm or reject an earlier decision based on the bicycle detection strip for the presence of a bicycle 104 in the virtual bicycle zone.

Examples of image processing techniques for bicycle differentiation may be further found in U.S. Pat. No. 8,933,818.

In another embodiment, the image processing and pixel analysis component 141 classifies an object 102 by associating groups of moving pixels having common pixel characteristics. This represents an analysis of the "whole scene" of the field of view 112 to distinguish between foreground objects and background objects. In such an embodiment, the present invention processes temporal information to analyze the foreground of the field of view 112, and processes spatial information to learn a detection zone background learning model.

Such a temporal analysis of the "whole scene" associates data points, such as for example pixels, uses common data point characteristics and attempts to identify one or more groups of moving data points. Common data point characteristics enable an initial identification of a group of moving data points as a foreground object, and these at least include a color, a luminance, a position, and movement of the data points to identify an object in motion. The image processing and pixel analysis component 141 may further determine if a group of moving pixels represent one or more foreground objects inside the traffic detection zone 114, and identify an object type of the one or more foreground objects based on dominant object type features. Such features include pixel intensity, pixel edges, pixel texture content, pixel shape, object attributes, and object tracking attributes for each object type.

The detection zone background learning model examines specific data point attributes within the traffic detection zone 114, and attempts to adaptively learn what is in the background over time. The learned model is then applied to differentiate all of or a portion of detection zone data points from known background objects. In this embodiment, the present invention extracts multi-dimensional spatial features, and then learns statistical thresholds for background characteristics, resulting in an adaptive model of the background that is continuously generated and adjusted as additional input data is ingested. Through this process of analyzing spatial information, the bicycle detection and notification framework 100 continually learns what objects are part of the background.

Background characteristics include one or more of a roadway surface, roadway or lane markings, and roadway shadows within the traffic detection zone 114. These may include permanent and temporary characteristics as well as items which change over time at different rates. Examples of these multi-dimensional data point attributes include a pixel histogram, directional edges, and a gray scale mean. Other examples include a motion analysis (optical flow), frame difference data, and corner features.

Examples of image processing techniques for such object detection and identification may be further found in U.S. Pat. No. 9,418,546.

In another embodiment of the present invention, a user may configure one or more aspects of the bicycle detection and notification framework 100 using a traffic management support tool 190. Additionally, output data 160 may be provided directly to the traffic management support tool 190.

Various aspects of the bicycle detection and notification framework 100 may be configured in a number of ways using the traffic management support tool 190. For example, the traffic detection zone 114 may be initialized by a user via the traffic management support tool 190, such as via an application resident on a computing device and/or using a graphical user interface. The user may select a specific size and location of one or both of a field of view 112 and a traffic detection zone 114 in relation to a traffic intersection 110, or other portion of a roadway 118. The field of view 112 and the traffic detection zone 114 may be pre-selected by a user prior to performance of the data processing paradigms defined herein, and may also be adjusted by the user during system performance. Alternatively, the size, location, and number of traffic detection zones 114 may be automatically selected and adjusted.

Regardless, the traffic management support tool 190 supports both zone and lane analytics 182, and a traffic management system 180 for control of a traffic system controller 170 using the output data 160 and a control system. The traffic management support tool 190 may include widgets, drop-down menus, and other indicia presented via a graphical user interface that enable a user to make selections and perform functions attendant to operation of the bicycle detection and notification framework 100.

Figure 3:
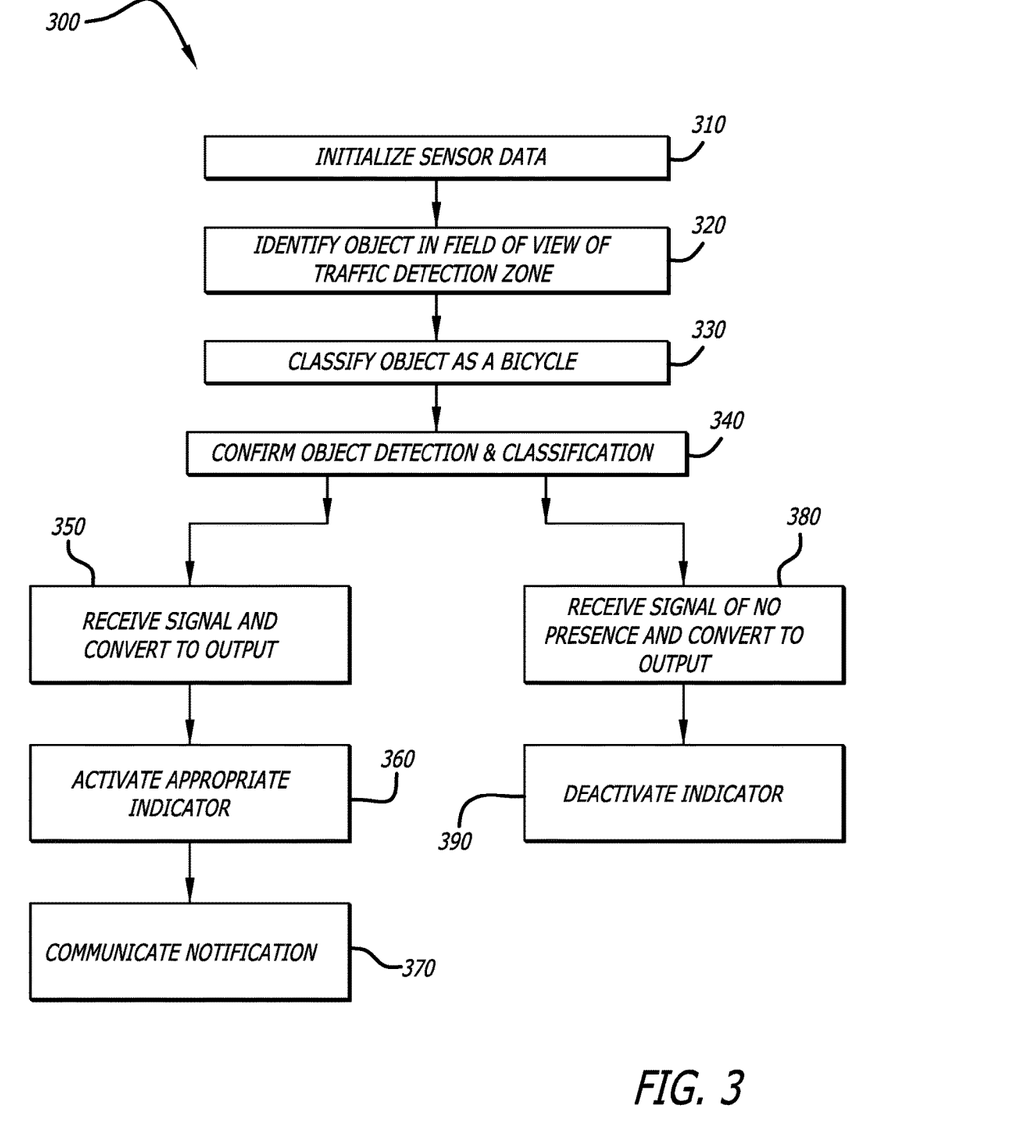
FIG. 3 is a flowchart of steps for performing a bicycle detection and notification framework according to one embodiment of the present invention.

FIG. 3 is a flowchart of steps in a process of performing a bicycle detection and notification framework 100 for identifying one or more objects 102 within a traffic detection zone 114 at a traffic intersection 110, and generating output data 160 representing notifications 162 to cyclists 106, according to one embodiment of the present invention. In step 310, the present invention initializes input data 108 that is ingested, received, acquired, or otherwise obtained from the one or more sensors 120. At step 320, multiple algorithms are applied to the input data 108 to identify an object 102 and classify it as a bicycle 104 at step 330.

The present invention may perform the step 340 of confirming whether the object 102 is indeed a bicycle 104. This is performed by ingesting additional input data 109 and performing further data processing techniques in the object confirmation component 142 as discussed above. If a bicycle 104 is classified at step 330 and confirmed at step 340, then the bicycle detection and notification framework 100 generates a signal at step 350 that a bicycle 104 has been detected. This signal is then used to activate an appropriate indicator at step 360, and a notification 162 is generated and communicated at step 370.

It is to be further understood, as noted above, that other actions are possible with the converted signal at step 350 representing a bicycle's detection, and therefore the output from the signal converted at step 350 may take many forms. For example, the present invention may be combined with other data processing paradigms to extend and/or adjust a signal timing for the traffic intersection 110 to ensure rider safety. The output may be further applicable for use in analyzing roadway usage and other aspects of managing flow at a traffic intersection 110, for example by enabling a count 166 of bicycles 104 present at the traffic intersection 110 at various times of day.

If a bicycle is not determined at step 330 and confirmed, where applicable, at step 340, then the bicycle detection and notification framework 100 generates a signal that a bicycle 104 is not, or no longer, present in the traffic detection zone at step 380. At step 390, the indicator is deactivated.

Figure 4:
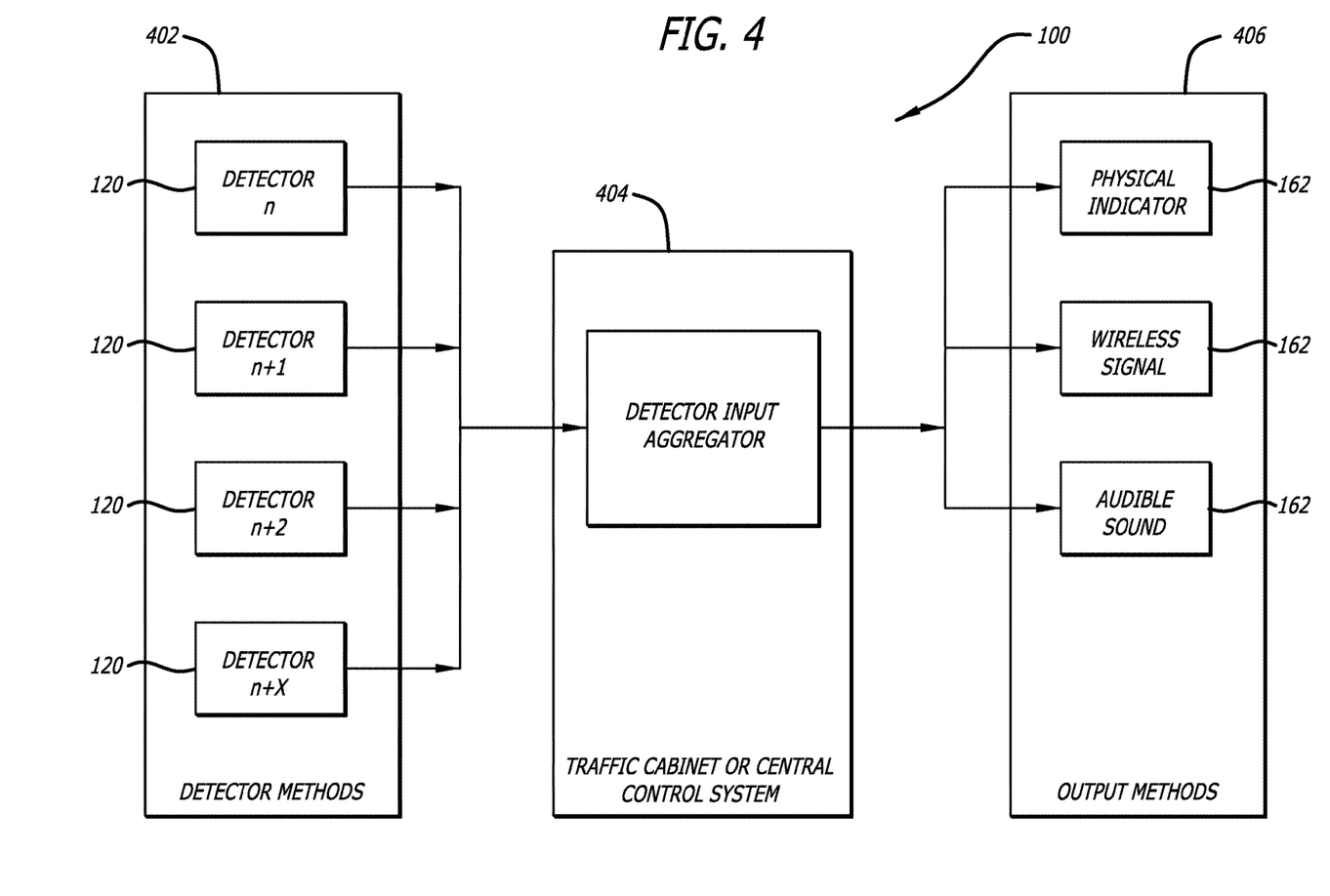
FIG. 4 is a block diagram of system components of a bicycle detection and notification framework according to one embodiment of the present invention.

FIG. 4 is a diagram of general system components of a bicycle detection and notification framework 100 that illustrate one embodiment of the present invention. In FIG. 4, multiple detection methods 402 are contemplated, each providing input data 108 and 109 to a plurality of data processing modules 134. The plurality of data processing modules 134 are collectively indicated as a detector input aggregator 404, which produces notifications 162 according to the ways described above (physical alert, wireless signal, audible sound, video signal, etc.). In the embodiment of FIG. 4, the bicycle detection and notification framework 100 is agnostic as to the sensor(s) 120 used to detect an object 102 in the traffic detection zone 114, and generates notifications 162 using all configured output methods 406 of providing an indicator to a cyclist 106.

Figure 5:
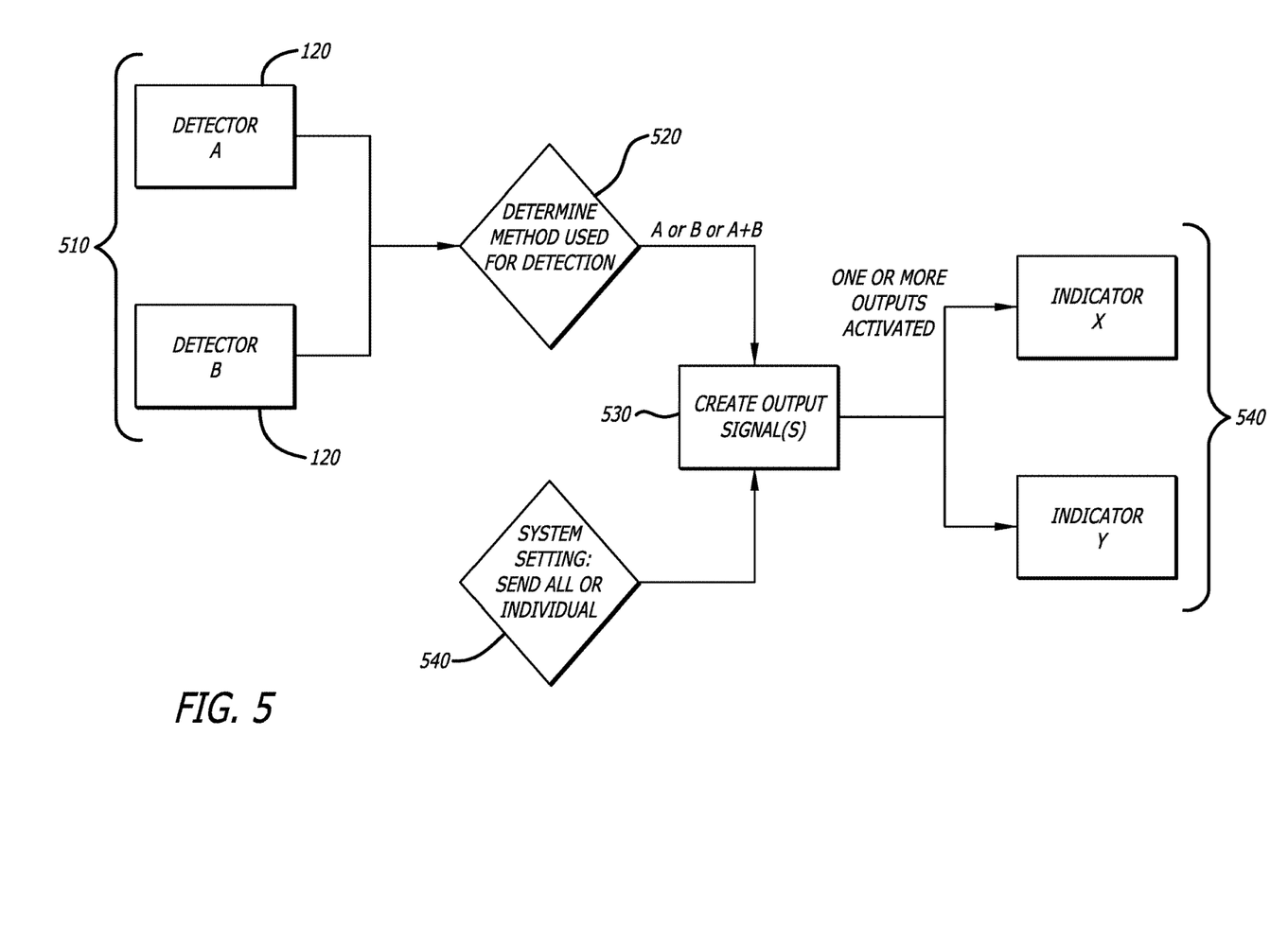
FIG. 5 is a block diagram of system components of a bicycle detection and notification framework according to another embodiment of the present invention.

FIG. 5 is a diagram of general system components of a bicycle detection and notification framework 100 that illustrate an alternative embodiment of the present invention. In this embodiment, multiple types of detectors 510 are contemplated, but the bicycle detection and notification framework 100 includes a step 520 of determining the method specifically used to generate sensor data 108 and 109. The bicycle detection and notification framework 100 uses this determination to create output signals at step 530 that are configured for specific indicators 540 that match detectors 510. As noted above, this may occur where a detector 510 includes a signal sent from a mobile computing device 129 used by a cyclist 106, such as for example a GPS signal automatically sent from computer-enabled eyewear when approaching a traffic intersection 110. The bicycle detection and notification framework 100 in such an embodiment activates a signal that communicates with the cyclist's eyewear to notify the cyclist 106 that he or she has been detected. It is to be understood that in the embodiment of FIG. 5, a system setting 540 may be configured so that one or more output signals 530 are configured, either for all detectors 510, or for specific detectors 510.

Figure 6:
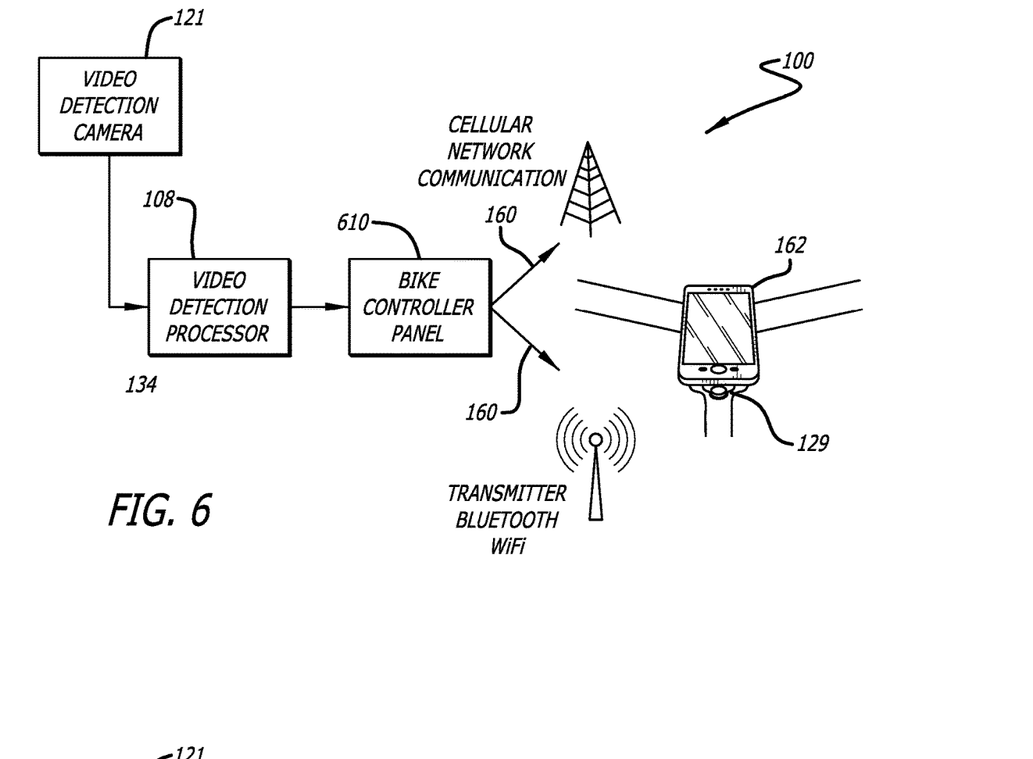
FIG. 6 is a diagram of hardware components for performing a bicycle detection and notification framework according to one embodiment of the present invention.

FIG. 6 is an illustration of hardware components in a system for performing the bicycle detection and notification framework 100 according to one embodiment of the present invention. In FIG. 6, a video camera 121 represents one or more sensors 120, and generates input data 108. Input data 108 is transmitted from the video camera 121 to a detection processor embodiment in the data processing modules 134, which performs the image processing and pixel analysis functions within the classification and confirmation module 140, and the signal conversion and alert formatting components within the notification and alerts module 150. In the embodiment of FIG. 6, a signal is then communicated to specific hardware components 610 at the traffic signal controller 170 which transmit the output data 160 to a mobile computing device 129 or other personal information device used by a cyclist 106, such as for example a device mounted on a bicycle 104 or on the rider herself, using wireless protocols such as over a cellular network, a Bluetooth connection, a WiFi (wireless local area networking) connection, DSRC (dedicated short-range communications), or any other form of direct wireless transmission.

Figure 7:
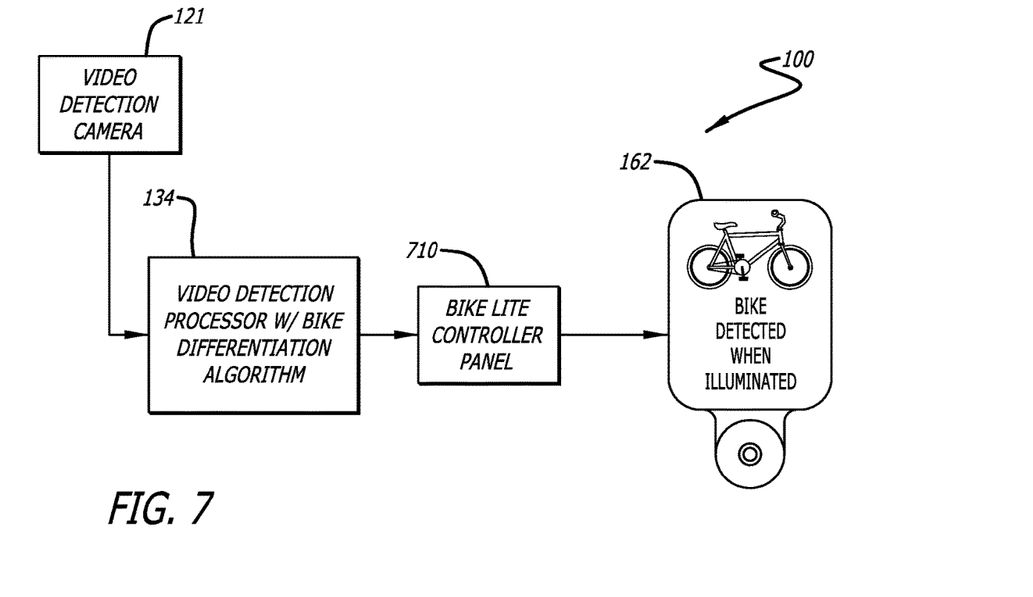
FIG. 7 is a diagram of hardware components for performing a bicycle detection and notification framework according to another embodiment of the present invention.

FIG. 7 is an illustration of hardware components in a system for performing the bicycle detection and notification framework 100 according to an alternate embodiment of the present invention. In this embodiment, following processing by the detection processor embodiment in the data processing modules 134, a signal is communicated to specific hardware components 710 which transmit the notification 162 to an indicator assembly that is positioned to be seen by a cyclist 106, such as a device where one or more lights indicate that a bicycle 104 has been detected when illuminated.

In the bicycle detection and notification framework 100 of the present invention, each sensor or detector generates an output signal to indicate that it has detected a bicycle. This is represented for example in FIG. 1 as signal 164, or output of step 340 of FIG. 3. This output signal 164 can be of various types, typically analog or digital. In analog output embodiments, the output signals 164 can be an open collector output, relay contact or specific voltage level. In digital output embodiments the digital output signals 164 can be a digital bit on or off, a specific electronic sequence or various digital message formats. These output signals 164 are sent to a control system, for example as discussed with regard to FIG. 3, steps 350 and 380, to convert the sensor output signal 164 to an indication. In an analog embodiment, this control system, for example in FIG. 7 the specific hardware components 710 (shown therein as Bike Lite Controller Panel), can be a simple electromechanical switch to activate an electronic circuit to light up an indicator sign. In a digital embodiment, it can be a microprocessor-based system to accept the signal 164 from the sensor and convert it to a wireless signal indication, for example in FIG. 6, the specific hardware components 610 (shown therein as Bike Controller Panel) for sending to a mobile computing device 129 carried on the bicycle or to a wireless message sign.

The systems and methods of the present invention may be implemented in many different computing environments. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
receiving sensor data collected from at least one sensor positioned in or near a traffic intersection, and configured to detect a presence of an object in one or more lanes of a roadway proximate to the traffic intersection without communication between the object and traffic signaling equipment at the traffic intersection;
analyzing a plurality of pixel characteristics extracted from the sensor data within a computing environment in one or more data processing modules executed in conjunction with at least one specifically-configured processor, the one or more data processing modules configured to identify the object from the sensor data, by analyzing, in a field of view of a traffic detection representing the one or more lanes of the roadway, multi-dimensional data point attributes among the plurality of pixel characteristics to classify the object as a bicycle, by evaluating spatial and temporal attributes of the pixel characteristics that include one or more of a pixel histogram, a directional edge, and a gray scale mean to distinguish object features and object motion in the traffic detection zone, comparing the spatial and temporal attributes of the pixel characteristics with attributes of known objects to confirm that the at least one sensor has detected a bicycle from the object, and generating a signal indicating that the at least one sensor has detected the bicycle;

converting the signal to generate an indicator representative of a presence of the bicycle at or near the traffic intersection; and transmitting the indicator to a control system, and activating one or more of a visual notification, a physical notification, or an aural notification from the indicator to alert a cyclist that the presence of the bicycle has been detected at the traffic intersection as the cyclist approaches the traffic intersection.

2. The method of claim 1, further comprising determining an appropriate notification for the cyclist, the appropriate notification selected by matching a signal format of the notification to a signal format of the sensor data from the at least one sensor.

3. The method of claim 1, wherein the sensor data is captured from at least one of a video camera, a radar system, a magnetometer, an inductive loop, and a signal generated by a mobile device used by the cyclist.

4. The method of claim 1, wherein the analyzing characteristics in a field of view of a traffic detection area representing the one or more lanes of the roadway further comprises analyzing multi-dimensional data point attributes to classify the object, the analyzing multi-dimensional data point attributes to classify the object including one or more of an optical flow analysis to evaluate motion in the traffic detection zone, an edge detection analysis to evaluate spatial and temporal attributes of pixels in the input data, and a template matching analysis to compare the object with known attributes of a motorized vehicle, a bicycle, and a pedestrian.

5. The method of claim 1, further comprising checking for additional sensor data available from one or more additional sensors, the one or more additional sensors configured to receive a) a communication from an application resident on a mobile device used by a cyclist and generating a signal at or near the traffic intersection, or b) one or more of pressure, heat, position, or inductance information relative to at least one of the bicycle and the cyclist at or near the traffic intersection, to confirm a classification of the object.

6. The method of claim 1, wherein the notification is one or more of a physical alert, a video signal, and an audible sound.

7. The method of claim 1, wherein the notification is a wireless signal communicated over one or more of a cellular network, a Bluetooth connection, a dedicated short-range communications connection, a wireless local area networking connection, or a communication with a mobile device.

8. The method of claim 7, wherein the wireless signal is specific to the cyclist and communicated to an application resident on the mobile device.

9. The method of claim 1, further comprising continually evaluating one or more of the sensor data and the additional sensor data to determine if the bicycle is still present in the traffic detection area, and canceling the notification where the bicycle is no longer detected at the traffic intersection.

10. A method of notifying a cyclist of detection at a traffic intersection, comprising:

classifying an object in a traffic detection area at a traffic intersection from sensor data collected from at least one sensor positioned in or near the traffic intersection, and configured to detect a presence of the object in one or more lanes of a roadway proximate to the traffic intersection without communication between the object and traffic signaling equipment at the traffic intersection, by analyzing, for a field of view representing the one or more lanes of the roadway, multi-dimensional data point attributes in a plurality of pixel characteristics extracted from the sensor data to determine if the object is a bicycle, by evaluating spatial and temporal attributes of the pixel characteristics that include one or more of a pixel histogram, a directional edge, and a gray scale mean to distinguish object features and object motion in the traffic detection zone, and comparing the spatial and temporal attributes of the pixel characteristics with attributes of known objects to confirm that the at least one sensor has detected a bicycle from the object, in one or more of an optical flow analysis to evaluate motion in the traffic detection zone, an edge detection analysis to evaluate spatial and temporal attributes of pixels in the sensor data, and a template matching analysis, and generating a signal indicating that the at least one sensor has detected the bicycle;

converting the signal to generate an indicator representative of a presence of the bicycle at or near the traffic intersection; and applying the indicator to a control system to a activate one or more of a visual notification, a physical notification, or an aural notification to alert a cyclist that the presence of the bicycle has been detected at the traffic intersection as the cyclist approaches the traffic intersection.

11. The method of claim 10, further comprising determining an appropriate notification for the cyclist, the appropriate notification selected by matching a signal format of the notification to a signal format of the sensor.

12. The method of claim 10, wherein the sensor data is captured from at least one of a video camera, a radar system, a magnetometer, an inductive loop, and a signal generated by a mobile device used by the cyclist.

13. The method of claim 10, further comprising confirming a classification of the object by checking for additional sensor data available from one or more additional sensors, the one or more additional detectors configured to receive a) a communication from an application resident on a mobile device used by a cyclist and generating a signal at or near the traffic intersection, or b) one or more of pressure, heat, position, or inductance information relative to at least one of the bicycle and the cyclist at or near the traffic intersection.

14. The method of claim 10, wherein the notification is one or more of a physical alert, a video signal, and an audible sound.

15. The method of claim 10, wherein the notification is a wireless signal communicated over one or more of a cellular network, a Bluetooth connection, a dedicated short-range communications connection, a wireless local area networking connection, or a communication with a mobile device.

16. The method of claim 15, wherein the wireless signal is specific to the cyclist and communicated to an application resident on the mobile device.

17. The method of claim 10, further comprising continually evaluating the sensor data to determine if the bicycle is still present in the traffic detection area, and canceling the notification where the bicycle is no longer detected at the traffic intersection.

18. The method of claim 10, further comprising communicating the indicator to a traffic signal controller.

19. A system, comprising:
a computing environment including at least one non-transitory computer-readable storage medium having program instructions stored therein and a computer processor operable to execute the program instructions within one or more data processing modules configured to notify a cyclist of detection at a traffic intersection, the one or more data processing modules including:
a classification module configured to analyze, for a field of view representing one or more lanes of a roadway, multi-dimensional data point attributes in a plurality of pixel characteristics extracted from sensor data collected from at least one sensor positioned in or near a traffic intersection, the at least one sensor configured to detect a presence of an object in one or more lanes of a roadway proximate to the traffic intersection without communication between the object and traffic signaling equipment at the traffic intersection, to classify the object as a bicycle by evaluating spatial and temporal attributes of the pixel characteristics that include one or more of a pixel histogram, a directional edge, and a gray scale mean to distinguish object features and object motion in the traffic detection zone, and comparing the spatial and temporal attributes of the pixel characteristics with attributes of known objects to confirm that the at least one sensor has detected a bicycle from the object, and generate a signal indicating that the at least one sensor has detected the bicycle; and
an output module configured to convert the signal to generate an indicator representative of a presence of the bicycle at or near the traffic intersection and communicate the indicator to a control system, and activate one or more of a visual notification, a physical notification, or an aural a notification from the indicator to alert the cyclist that the presence of the bicycle has been detected at the traffic intersection as the cyclist approaches the traffic intersection.

20. The system of claim 19, wherein the output module is further configured to select an appropriate notification for the cyclist by matching a signal format of the notification to a signal format of the at least one sensor.

21. The system of claim 19, wherein the sensor data is captured from at least one of a video camera, a radar system, a magnetometer, and a signal generated by a mobile device used by the cyclist.

22. The system of claim 19, wherein the classification module is configured to analyze multi-dimensional data point attributes to classify the object, the analyzing multi-dimensional data point attributes to classify the object including one or more of an optical flow analysis to evaluate motion in the traffic detection zone, an edge detection analysis to evaluate spatial and temporal attributes of pixels in the input data, and a template matching analysis to compare the object with known attributes of a motorized vehicle, a bicycle, and a pedestrian.

23. The system of claim 19, wherein the classification module is further configured to check for additional sensor data collected from one or more additional detectors, the one or more additional detectors configured to receive a) a communication from an application resident on a mobile device used by a cyclist and generating a signal at or near the traffic intersection, or b) one or more of pressure, heat, position, or inductance information relative to at least one of the bicycle and the cyclist at or near the traffic intersection, to confirm a classification of the object.

24. The system of claim 19, wherein the notification is one or more of a physical alert, a video signal, and an audible sound.

25. The system of claim 19, wherein the notification is a wireless signal communicated over one or more of a cellular network, a Bluetooth connection, a dedicated short-range communications connection, a wireless local area networking connection, or a communication with a mobile device.

26. The system of claim 25, wherein the wireless signal is specific to the cyclist and communicated to an application resident on the mobile device.

27. The system of claim 19, wherein the classification module is further configured to continually evaluate the sensor data to determine if the bicycle is still present in a traffic detection area of the traffic intersection, and communicate a signal to the output module to cancel the notification where the bicycle is no longer detected at the traffic intersection.

* * * * *